UNITED STATES PATENT OFFICE 2,667,506

SURFACE-ACTIVE COMPOSITION

Joachim Dazzi, Dayton, Ohio, assignor to Monsanto Chemical Company, St. Louis, Mo., a corporation of Delaware No Drawing. Application August 25, 1951, Serial No. 243,756

8 Claims. (Cl. 260—512)

The present invention relates to compounds having high surface-activity in aqueous solutions and to processes for preparing the said compounds.

According to the invention there is provided a series of new and valuable alkali metal (alkylphenoxy) alkanesulfonates possessing exceptionally high wetting-out and lathering properties. The new compounds are easily obtained by the condensation of alkane sultones with alkylphenols in an alkaline medium, the reaction proceeding substantially according to the scheme:

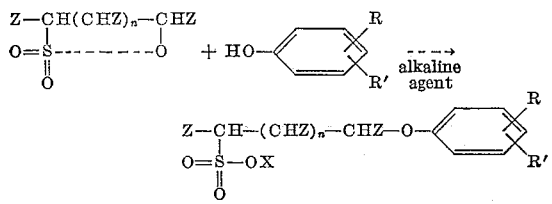

in which Z in selected from the class consisting of hydrogen and the methyl radical, and in which only two Z's are methyl; $n$ is an integer of from 1 to 2; X is alkali metal; and R and R' are selected from the class consisting of hydrogen and alkyl radicals of from 5 to 14 carbon atoms, and in which at least one of R and R' is the alkyl radical and in which the total number of carbon atoms in R and R' is from 7 to 14.

Alkane sultones employed for the production of the present (alkylphenoxy) alkanesulfonates are readily available materials which may be prepared in good yields by sulfochlorination of certain alkyl chlorides to yield chloroalkanesulfonyl chlorides, hydrolysis of the acid halides to the corresponding sulfonic acids and ring closure of the latter with hydrogen chloride evolution. Sultones are commonly regarded as ring closure products of hydroxy sulfonic acids and are similar in structure to lactones, obtainable by ring closure of hydroxy carboxylic acids. Hence a preferred nomenclature for the alkane sultones recites the hydroxyalkane sulfonic acid from which the alkane sultone is derived. Thus one sultone which is useful for the present purpose may be called the sultone of 3-hydroxy-1-propane-sulfonic acid,

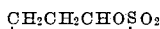

This sultone is also obtainable by the sulfochlorination process from propyl chloride through the 3-chloro-1-propanesulfonic acid, and may be referred to as the sultone of the chloro-acid. Because sulfochlorination of alkyl halides often results in the introduction of the sulfonyl radical at more than one carbon atom, mixtures of (chloroalkane) sulfonic acids are generally formed. Conversion of the mixture of acids to the corresponding sulfonyl chlorides and ring closure of the latter leads to the formation of a mixture of alkane sultones. Hence for practical purposes sultones derived via the sulfochlorination process will be referred to simply as alkane sultones, the individual alkane in each case corresponding to the alkyl halide from which the intermediately formed haloalkanesulfonyl chloride is formed. Thus the term butane sultone will be used to indicate the structure

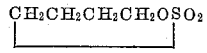

the structure

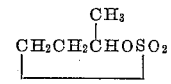

or the structure

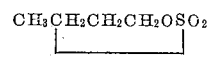

since these structures are all possible for a butane sultone obtained from the sulfochlorination product of butyl chloride. The terms isobutane sultone, pentane sultone and isopentane sultone similarly do not show the exact structure of the sultone, but do indicate the number of carbon atoms and the probable branching of the alkane portion of the sultone. The sultones which may be used in the present invention are the alkane sultones mentioned above as well as sultones of such γ or δ-hydroxy or chloro-substituted alkane sulfonic acids of from 3 to 6 carbon atoms as e. g., 4-hydroxy-2-butanesulfonic acid, 3-chloro-1-propanesulfonic acid or 4-hydroxy-1-butanesulfonic acid.

Alkylphenols which react with the sultones to yield the present surface-active compounds are mono- or di-alkylphenols in which there is a total of from 7 to 14 carbon atoms in the alkyl substituents, i. e., alkylphenols of from 13 to 20 carbon atoms. As examples of such phenols may be mentioned 3-n-heptylphenol, 4-isooctylphenol, 4-tert-nonylphenol, 2-n-decylphenol, 4-n-tetradecylphenol, 2,4-di-tert-amylphenol, 3,4-di-n-heptylphenol, 3,4-diisohexylphenol, 3-n-amyl-4-n-heptylphenol, 3-(2-ethylhexyl)-4-n-hexylphenol, etc.

As illustrative of alkali metal (alkylphenoxy) alkanesulfonates provided by the present invention may be mentioned sodium 3-(4-n-heptylphenoxy)-1-propanesulfonate, sodium 4-(4-n-dodecylphenoxy)-1-butanesulfonate, potassium 4-(4-tert-nonylphenoxy)-2-butanesulfonate, lithium 4-(3,4-di-n-amylphenoxy)-2-methyl-2-butanesulfonate, sodium 4-(2-n-tetradecylphenoxy)-2-pentanesulfonate, potassium 4-[4-(2-ethylhexyl)phenoxy]-3-methyl-2-pentanesulfonate, etc., as well as the alkali metal (alkylphenoxy)alkanesulfonates obtained from insufficiently characterized alkane sultones, e. g., the sodium (4-n-decylphenoxy)butanesulfonate obtained from sulfochlorination butane sultone and 4-n-decylphenol in the presence of sodium hydroxide, the sodium (4-n-octylphenoxy)isopentanesulfonate obtained from sulfochlorination isopentane sultone and 4-n-octylphenol in the presence of sodium methoxide, and the potassium (3,4-di-n-heptylphenoxy)isohexanesulphonate obtained from sulfochlorination isohexane sultone and 3,4-di-n-heptylphenol in the presence of potassium carbonate.

In order to obtain directly the easily separated alkali metal sulfonates rather than the free sulfonic acids, reaction of the sultone with the alkylphenol is effected in the presence of an alkali metal salt-forming agent. Examples of such agents are alkali metal oxides or hydroxides and the alkaline-reacting salts thereof such as the sodium, potassium or lithium oxides, hydroxides, carbonates, bicarbonates, or acetates. The alkali metal alcoholates or phenoxides are convenient salt-forming agents for the present purpose in that their use permits operation in organic solvents or diluents, e. g., methanol, ethanol, or phenol, from which the alkali metal sulfonates are readily separated. Alkali metal alcoholates or phenoxides which are preferred include sodium, potassium or lithium methoxide, propoxide, butoxide, or phenoxide.

While condensation of the alkane sultone, the alkylphenol and the salt-forming agent may be effected either in the presence or absence of an inert solvent or diluent, operation is smoother and manipulation of the reactants and product is facilitated when a solvent or diluent is used. When working with the inorganic alkalis, water or mixtures of water and an inert organic solvent or diluent are preferably employed. Organic materials which may be used either as diluents with the inorganic alkaline agents or as solvents with the alkali alcoholates or phenoxides are, e. g., the lower-boiling alcohols such as methanol, ethanol, isopropanol, or n-butanol, ketones such as acetone or methyl ethyl ketone, ethers such as ethyl or isopropyl ether, hydrocarbons such as benzene, toluene, or hexane, etc. In some instances it is convenient to prepare the alkali metal alcoholate or phenoxide in situ, employing an excess of the hydroxy component as diluent. Thus the initial reaction mixture may consist of the sultone, the alkylphenol, an alkaline metal hydroxide and an alcohol. During the reaction, the alkali metal hydroxide reacts with the alcohol to form an alcoholate, which then serves to neutralize the sulfonic acid. In this procedure, an excess of the alcohol and the reaction water formed in producing the alcoholate serve as diluents.

Reaction of the alkane sultone with the alkylphenol takes place readily at ordinary or increased temperatures. The sultone is simply contacted with the alkylphenol and the resulting mixture is allowed to stand until formation of the sulfonic acid or the sulfonate is complete. For convenience, the alkaline salt-forming agent is generally mixed with the sultone and the phenol initially; however, the alkaline material may be added to the mixture of sultone and phenol during the reaction or even after condensation of the two reactants is completed. While reaction may be effected at ordinary room temperature, i. e., without external heating, better yields and shorter reaction time are obtained by heating the mixture of reactants to the refluxing temperature. When employing water or low-boiling reaction diluents, this temperature is generally less than 100° C. Generally the (alkylphenoxy)alkanesulfonates are obtained in substantially quantitative yields after a reaction time of only a few hours when external heating is employed. The product is isolated by simply distilling off any unreacted materials or diluents and air-drying of the residue. The material thus obtained is substantially free of inorganic salts.

The (alkylphenoxy)alkanesulfonates are stable, water-soluble, generally white to slightly yellow, friable solids or powdery materials. The high surface-activity of aqueous solutions of even very small amounts of the present sulfonates makes them particularly valuable as wetting-out agents. Some of the members of this series are likewise very good foaming agents, especially in hard water. Other members of the series display pronounced cotton rewetting properties.

The present invention is further illustrated, but not limited, by the following examples:

Example 1

This example shows the preparation of a sodium (4-octylphenoxy)butanesulfonate from a branched-chain 4-octylphenol, i. e., a 4-(diisobutyl)phenol, B. P. 280–283° C., and a mixture of isomeric butane sultones obtained by chlorosulfonation of n-butyl chloride, hydrolysis of the resulting chloroalkanesulfonyl chlorides to the free chloroalkanesulfonic acids and ringclosure of the latter by dehydrohalogenation. A mixture consisting of 10.3 g. (0.05 mole) of the octylphenol, 6.8 g. (0.05 mole) of the sultone and 2.7 g. (0.05 mole) of sodium methylate in 30 ml. of methanol was heated at 60° C.–65° C. for 2.5 hours. Removal of the methanol by distillation and vacuum drying of the residue gave 16.2 g. (substantially quantitative yield) of a mixture of isomeric, branched-chain sodium(4-octylphenoxy)butanesulfonates, possessing the surface-active properties shown in Examples 4 and 6.

Example 2

A solution of 17.55 g. (0.075 mole) of 2,4-di-tert-amylphenol and 4.05 g. (0.075 mole) of sodium methylate in 30 ml. of methanol was heated to a temperature of 62° C., and to the heated solution there was added 10.2 g. (0.075 mole) of the mixture of butane sultones described in Example 1. The resulting mixture was heated at 60–70° C. for 4 hours, the solvent was removed from the resulting reaction mixture by distillation, and the residue was oven-dried. There was thus obtained 28.9 g. of a mixture of yellow, resin-like sodium (2,4-di-tert-amylphenoxy)-butanesulfonates, having the surface-active properties shown in Example 4.

Example 3

A mixture consisting of 16.5 g. (0.075 mole) of a branched-chain 4-nonylphenol, 4.05 g. (0.075 mole) of sodium methylate and 15.5 ml. of methanol was heated at 60° C. for a few minutes in order to obtain a clear solution, and then about 10 ml. of the methanol was removed. To the residue there was added 0.075 mole of the mixture of isomeric butane sultones described in Example 1, and the whole was refluxed for 2.5 hours. Distillation of the methanol under partial vacuum, and drying of the residue gave 29.0 g. (100% theoretical yield) of a mixture of the semi-crystalline, greyish-white, branched-chain sodium (4-nonylphenoxy)butane-sulfonates having the surface-active properties shown in Examples 4 and 5.

*Example 4*

The speed of wetting as measured by the Draves Wetting Test of the American Association of Textile Chemists and Colorists of the products of Examples 1-3 is given below, together with similarly obtained test results for prior related wetting-out agents:

| Agent tested | Speed of wetting in seconds/percent concentration | | | | | |
|---|---|---|---|---|---|---|
| | 0.5 | 0.25 | 0.125 | 0.625 | 0.3125 | 0.0156 |
| Example 1 | Inst | 3.5 | 7.6 | 17.6 | 94.7 | +180 |
| Example 2 | Inst | 3.8 | 6.6 | 15.8 | 50.7 | +180 |
| Example 3 | 2.5 | 3.2 | 6.8 | 12.6 | 24.9 | 116.2 |

*Example 5*

Rewetting is the speed of wetting of a fabric or fiber which has been impregnated with a surface-active agent and then dried. Many commercially available wetting agents have good wetting-out ability, but are not satisfactory as rewetting agents.

The rewetting properties of the product of Example 3 and that of the commercial wetting agent "Aerosol OT" were tested by employing the Synthron Tape rewetting Test described on page 38 of the American Dyestuff Reporter for January 23, 1950. The following results were obtained:

| Percent concentration | Rewetting time, seconds | |
|---|---|---|
| | Example 3 | Aerosol OT* |
| 0.5 | 1.8 | 1.0 |
| 0.25 | 4.8 | 3.1 |
| 0.125 | 5.0 | 5.6 |
| 0.06 | 14.5 | 10.7 |
| 0.03 | 22.0 | 57.0 |

* Reported to be sodium bis(2-ethylhexyl)sulfosuccinate.

*Example 6*

The lathering property of the product of Example 1, as evaluated by the Ross-Miles Lather Test (a proposed method of the American Society for Testing Materials) was found to be as follows:

| | Lather height, cm. | |
|---|---|---|
| | At once | After 5 min. |
| At 50 p. p. m. water hardness | 16.5 | 16.5 |
| At 300 p. p. m. water hardness | 16.4 | 16.4 |

What I claim is:

1. An alkali metal salt of a sulfonic acid selected from the class consisting of (alkylphenoxy)butanesulfonic acid and (dialkylphenoxy)-butanesulfonic acid in which each alkyl radical has from 5 to 14 carbon atoms and the total number of carbon atoms in the alkyl radicals is from 7 to 14.

2. Sodium (4-octylphenoxy)butanesulfonate in which the octyl radical is branched.

3. Sodium (2,4-di-tert-amylphenoxy)butanesulfonates.

4. Sodium (4-nonylphenoxy)butanesulfate in which the nonyl radical is branched.

5. The process which comprises heating a butane sultone with an alkylphenol selected from the class consisting of mono and dialkylphenols from 13 to 20 carbon atoms in the presence of an alkali metal alcoholate and an inert diluent and recovering from the resulting reaction product an alkali metal salt of a sulfonic acid selected from the class consisting of (alkylphenoxy)butanesulfonic acids and (dialkylphenoxy)butanesulfonic acids in which each alkyl radical has from 5 to 14 carbon atoms and the total number of carbon atoms in the alkyl radicals is from 7 to 14.

6. The process which comprises heating a mixture of butane sultones with a branched chain 4-octylphenol and sodium methylate in methanol solution and recovering a mixture of branched chain (4-octylphenoxy)butanesulfonates from the resulting reaction product.

7. The process which comprises heating a mixture of butane sultones with 2,4-di-tert-amylphenol and sodium methylate in methanol solution and recovering a mixture of sodium (2-4-di-tert-amylphenoxy)butanesulfonates, from the resulting reaction product.

8. The process which comprises heating a mixture of butane sultones with a branched chain 4-nonylphenol and sodium methylate in methanol solution and recovering a mixture of branched chain sodium (4-nonylphenoxy-butanesulfonates, from the resulting reaction product.

JOACHIM DAZZI.

References Cited in the file of this patent

UNITED STATES PATENTS

| Number | Name | Date |
|---|---|---|
| 2,110,847 | De Groote | Mar. 8, 1938 |
| 2,167,325 | Steindorff et al. | July 25, 1939 |
| 2,451,579 | Schetty | Oct. 17, 1948 |
| 2,535,678 | Hollander et al. | Dec. 26, 1950 |

FOREIGN PATENTS

| Number | Country | Date |
|---|---|---|
| 798,728 | France | Mar. 11, 1936 |
| 905,684 | France | Apr. 23, 1945 |